(No Model.)
G. W. HUNTER.
Thill Coupling.
No. 235,438. Patented Dec. 14, 1880.
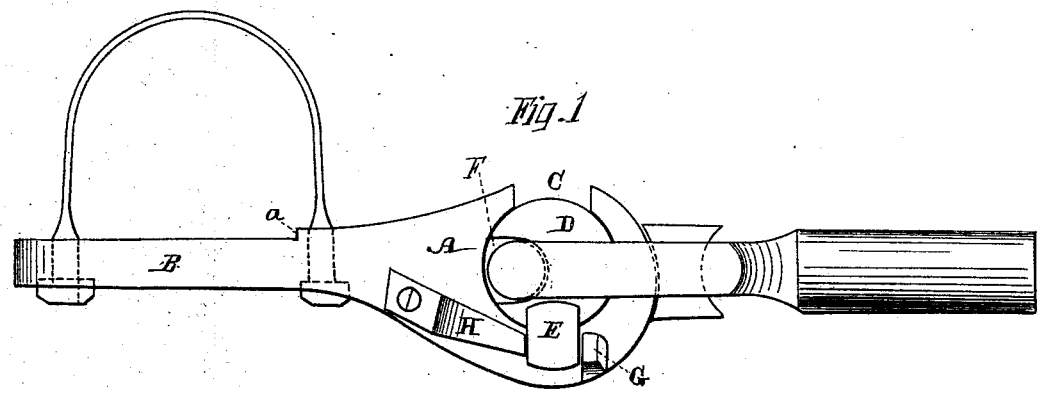
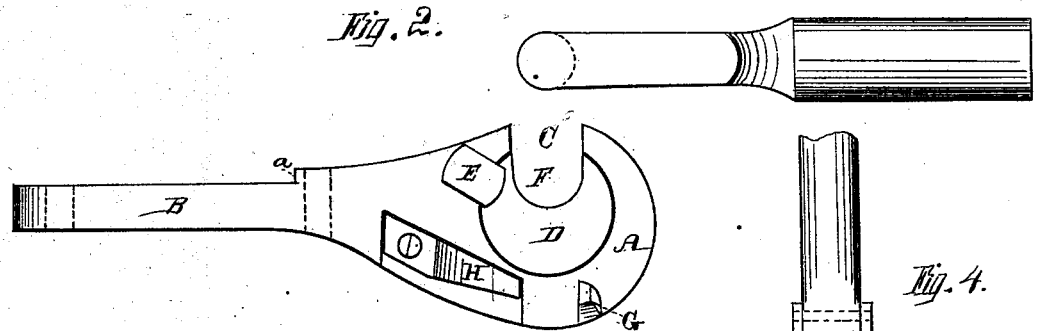
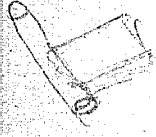
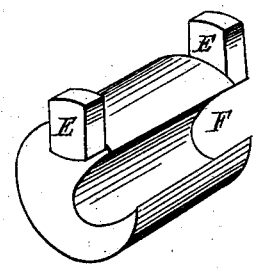
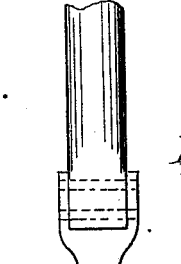
Witnesses
Geo. H. Strong.
Frank A. Brooks
Inventor
George W. Hunter
By Dewey & Co.
Attys

UNITED STATES PATENT OFFICE.

GEORGE W. HUNTER, OF MERCED, CALIFORNIA.

THILL-COUPLING.

SPECIFICATION forming part of Letters Patent No. 235,438, dated December 14, 1880.

Application filed July 22, 1880. (No model.)

*To all whom it may concern:*

Be it known that I, GEORGE W. HUNTER, of the city and county of Merced, and State of California, have invented an Eccentric Coupling; and I hereby declare the following to be a full, clear, and exact description thereof.

My invention relates to a novel coupling which may be employed for various purposes, such as securing poles or shafts to vehicles, the union of lengths of rods such as are employed in well-boring, and for other purposes.

My invention consists in certain limited details of construction in that class of thill-couplings wherein a slotted bolt revolves within circular eyes, and is provided with a spring-catch to hold the revolving bolt in a position to secure the shaft-iron, the said new details being for the purpose of making the operation of the catch automatic in whatever position it may be when it is undertaken to attach the shaft-irons.

Referring to the accompanying drawings for a more complete explanation of my invention, Figure 1 is a view of my coupling closed. Fig. 2 shows it open. Fig. 3 is a view of the cylinder removed from the head. Fig. 4 shows the coupling adapted to unite rods, &c.

A is a head, preferably made round, and having a hole of considerable size through its center. The extension B of this head is formed to extend beneath the axle of a vehicle, and it is secured to the axle by clips in the usual manner.

A shoulder, *a*, is formed upon the extension, and this serves to fit the extension upon the axle, so that each pair will have the heads A at an equal distance from it when in place, without any other care or measurement except to have the shoulders against the axle when the clips are fitted.

A slot, C, at the top of the head A connects with the central opening, and is of sufficient size to admit the coupling pin or iron.

A cylinder, D, is fitted to the hole so as to turn snugly but easily therein, and it is prevented from slipping out endwise by lugs E, which project upward from each end of it, as shown in Fig. 3.

When it is desired to slip this cylinder into or out of the hole in the head, these lugs are brought into line with the slot C, when the cylinder may be pushed out in either direction, as the lugs will pass through the slot. When the cylinder is turned so that the lugs are not opposite the slot, they serve to lock it in place and prevent it from coming out, but they allow it to turn easily.

A groove or slot, F, is made in one side of the cylinder D, extending the whole length, and being of sufficient size to receive the link or bolt which serves to couple the head with the opposite part.

When two parts are to be united the bolt or link of the opposite part is dropped into the slot F through the slot C, and the cylinder D is turned until the slot F is out of line with the slot C, and preferably opposite the point toward which the strain or pull will take place.

The lugs E prevent further rotation by striking the stops G, and the end of a spring, H, rising after the lugs have passed it, prevents the rotation of the cylinder backward, thus locking the connecting-link firmly in its place.

The strain of a pull is distributed through the head, and has no tendency to disconnect the coupling; but when desired it may be instantly disconnected by depressing the spring H and then rotating the cylinder until the slots C and F are again in unison, when the bolt may at once be lifted out.

A space is cut or beveled out below the spring or catch, so that any dirt which may become lodged beneath the catch will easily fall out.

I am aware that thill-couplings have heretofore been made wherein a revolving slotted bolt similar to mine secured the shaft-iron, and which was held in place by means of perforations in said bolt and a vertically-moving spring-bolt, and hence I make no broad construction claim. In such construction, however, when the slot is opposite the opening to pass in the shaft-iron, the spring-bolt is in such a position that it must be withdrawn before the revolving bolt can be moved, which is obviously disadvantageous. In my construction the bolt is always free to revolve and be carried to the automatic spring-catch, except when the shaft-iron is inserted and the spring holding the lug.

Having thus described my invention, what I claim as new, and desire to secure by Letters Patent, is—

In a thill-coupling provided with a revolving slotted bolt and encircling eyes, the lugs E E, attached to the end of the bolt, in combination with the spring H and stop G on the side of the ring A, all constructed as described, and for the purpose set forth.

In witness whereof I have hereunto set my hand.

G. W. HUNTER.

Witnesses:
S. H. NOURSE,
FRANK A. BROOKS.